Inventor
THOMAS J. KELLY
By Chas. L. Reif
Attorney

Patented Dec. 12, 1939

2,183,278

UNITED STATES PATENT OFFICE 2,183,278

RAKE CLEANING DEVICE

Thomas J. Kelly, Minneapolis, Minn.

Application May 2, 1938, Serial No. 205,405

2 Claims. (Cl. 55—146)

This invention relates to a rake cleaning device. It is well known to users of rakes that when grass, leaves and other similar material is raked that the material becomes clogged between the teeth of said rake and must frequently be taken off of the teeth. This removal of the clogged material is usually done by the hands of the operator. The clogging is more aggravated when the material is moist and the removal of the material is often an unpleasant task. With some material it takes almost as much time to clean the rake as to perform the raking operation.

It is an object of this invention to provide a rake cleaning device adapted to be carried by the rake, one that is extremely simple in construction and which may be very easily and quickly attached to or detached from the rake.

It is a further object of the invention to provide a rake cleaning device having a member with portions movable adjacent the front and rear sides of the teeth of said rake, said member having spaced members secured thereto extending upwardly therefrom in the rear of the rake teeth and having free ended hook portions extending over the top of the rake.

Figure 1:
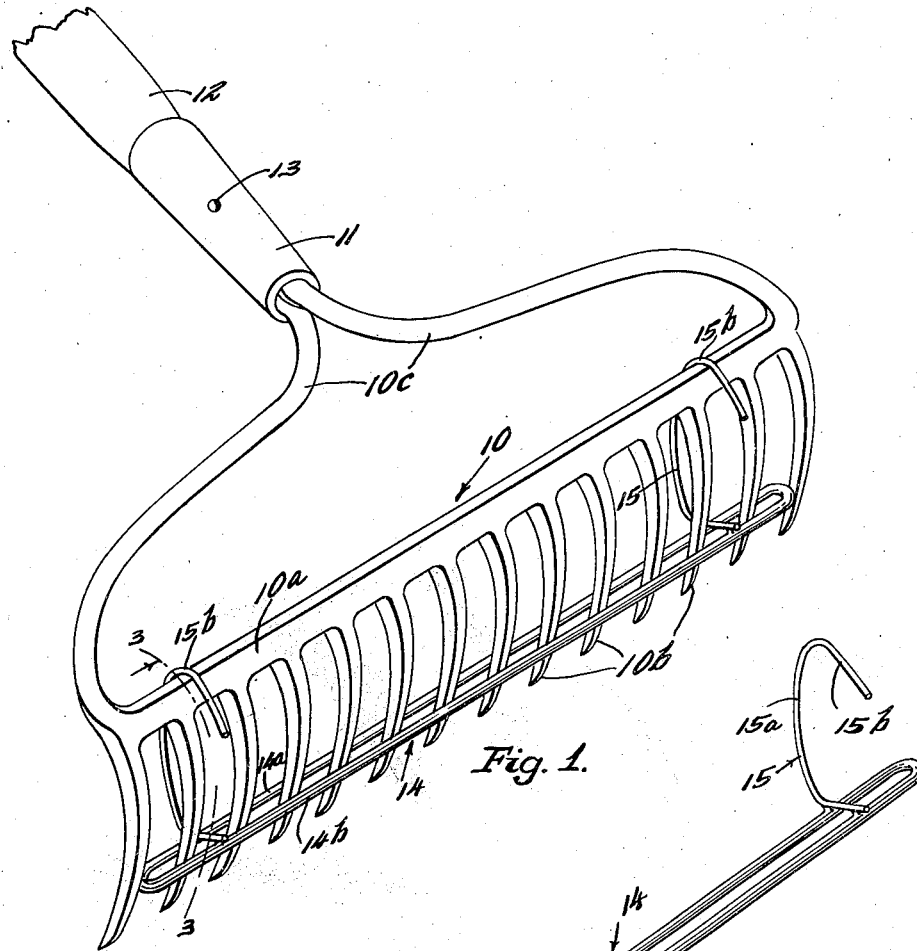
Figure 2:
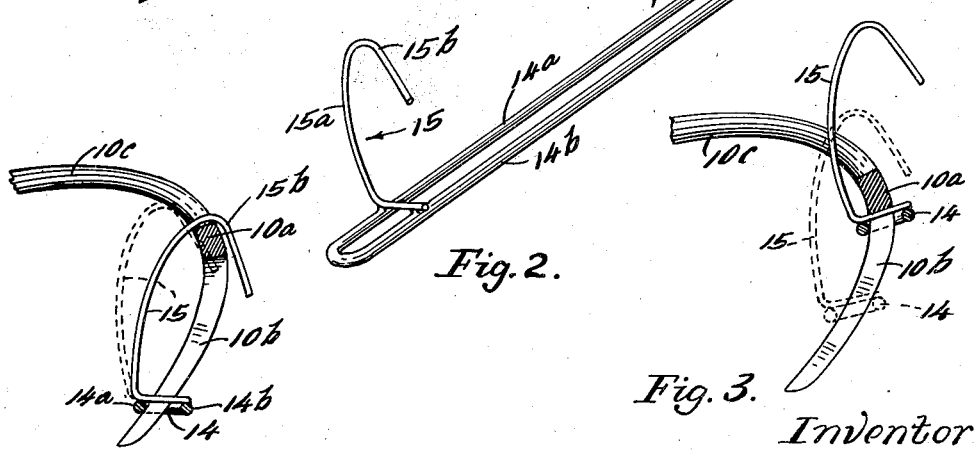
Figure 3:
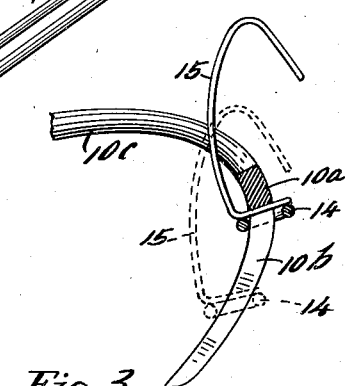
Figure 4:

These and other objects and advantages of the invention will be fully set forth in the following description made in connection with the accompanying drawing in which like reference characters refer to similar parts throughout the several views and in which:

Fig. 1 is a perspective view of a rake and a portion of the handle thereof showing the device of this invention applied thereto;

Fig. 2 is a perspective view of the rake cleaning device detached;

Fig. 3 is a vertical section taken substantially on line 3—3 as indicated by the arrow showing the rake cleaning device in its upper position, a lower position being indicated in dotted lines; and Fig. 4 is a view similar to Fig. 3 showing the rake cleaning device in its lower position with dotted lines indicating the position of the parts when the device is placed on said rake.

Referring to the drawing a rake designated generally as 10 is shown comprising the top bar or portion 10a from which extend downwardly the teeth 10b shown as tapering toward their free ends and as being somewhat curved with their convex portions at their forward sides. Rods 10c extend from each end of bar 10a being curved rearwardly and inwardly and then curved to be disposed in superposed position.
The ends of rods 10c are clamped and secured in a ferrule 11 shown as of tapering form and in the larger end of which is tightly secured a handle 12. A rivet 13 extends through handle 12 and ferrule 11.

In accordance with the present invention a rake cleaning device is provided comprising a member 14 and while this member might take various forms, in the embodiment of the invention illustrated it is shown as an elongated loop made from a small rod or heavy wire and as having substantially parallel portions 14a and 14b which are disposed respectively at the rear and front sides of the teeth 10b when in operative position. Member 14 has secured thereto adjacent its ends a pair of members 15 each having an upwardly extending portion 15a shown as somewhat curved and a free-ended hook portion 15b. While members 15 could be secured in any suitable manner in the embodiment of the invention illustrated they are shown as having their lower ends extending transversely and between members 14a and 14b and secured thereto by welding or soldering. The members 15a will be made of small rods or wires which are somewhat flexible.

When the device is to be placed on the rake the loop 14 will be disposed at the bottom of the teeth and moved upwardly thereon with members 15 at the rear of the teeth. Members 15 will be bent rearwardly somewhat so that as member 14 is moved upwardly on the teeth the ends of members 15 will clear the bar 10a. After the members 15 have been raised sufficiently for their free ends to be above bar 10a, said rods 15 will be bent forwardly about their lower portions where they connect with rod 14a. The amount of this forward bending is substantially the distance shown between the dotted and full line positions in Fig. 4. When members 15 are thus bent forwardly the device will be attached to the rake and in operative position. As the raking operation proceeds, if material collects or sticks to the rake it will push member 14 upwardly as it collects on the rake. The member can be moved upwardly until the tops of the lower portions of members 15 engage bar 10a. At this time or any time before the operator can jerk the rake or jar the front portion thereof by striking the handle against his hand or some object and this jerking or jarring will cause the bar 14 to move downwardly and the collected material to be discharged from the teeth 10b. It is, of course, obvious that if the operator desires he may take hold of member 14 and move it downwardly along the teeth thus clearing the rake.

It will be noted that portions 14a and 14b move closely adjacent the teeth and that the ends of member 14 move adjacent the outer teeth so that the teeth will be nicely cleaned when member 14 moves downwardly. As member 14 moves downwardly the angle of members 15 relative to the vertical changes, or in other words, said members swing forwardly due to the curved form of the teeth and the hook portions thus swing over the bar 10a. Most rakes are formed with the teeth having front surfaces of some convexity. This, however, is not necessary to the successful operation of the device. The device after being placed in position will not drop off of or become detached from the rake until it is positively removed by the operator.

From the above description it will be seen that I have provided an efficient and exceedingly simple rake cleaning device and one which can be attached and detached from the rake very quickly and easily. The device is, as stated very simple in structure and can be very inexpensively produced. The same can be made to suit any type of rake as garden rakes, lawn rakes, etc. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A rake cleaning device for a rake having a row of spaced teeth and a bar to which said teeth are connected comprising a member loosely and wholly supported upon said bar and teeth, said member having the form of an elongated loop enclosing said teeth and having substantially parallel portions at the front and rear of said teeth, a pair of members secured to said member adjacent the ends thereof and formed of small flexible rods or wires, said latter members each having a curved portion extending upwardly in the rear of said teeth with its concave side toward said teeth and having a free hook portion at its end extending forwardly over the top of said bar and downwardly some distance in front of said bar, said second mentioned members being constructed and arranged to be bent forwardly when the device is placed on said rake to prevent disengagement of said rake and device.

2. A rake cleaning device for a rake having a row of spaced teeth and a bar to which said teeth are connected comprising a member having parallel portions extending respectively at the front and rear of said teeth, said member having a pair of members secured thereto adjacent the ends thereof and formed of small wires or rods, said latter members extending upwardly in the rear of said teeth and being bent to extend over said bar and downwardly some distance in front thereof, said three members forming said complete device and said device being loosely supported on said teeth by said pair of members.

THOMAS J. KELLY.